United States Patent [19]

Mc Nally

[11] B 4,000,101
[45] Dec. 28, 1976

[54] THIOPHOSPHITES AND ULTRAVIOLET LIGHT STABILIZER FOR OLEFIN POLYMERS

[75] Inventor: George J. Mc Nally, West Orange, N.J.

[73] Assignee: Weston Chemical Corporation, Montvale, N.J.

[22] Filed: July 14, 1970

[21] Appl. No.: 54,859

[44] Published under the second Trial Voluntary Protest Program on February 17, 1976 as document No. B 54,859.

[52] U.S. Cl. .................... 260/23 H; 260/18 PF; 260/45.7 PS; 260/45.75 F; 260/45.75 M; 260/45.75 N; 260/45.75 T; 260/45.75 V; 260/45.75 W; 260/45.8 NT; 260/45.85 R; 260/45.95 F; 260/45.95 J; 260/45.95 R

[51] Int. Cl.² .................. C08K 5/13; C08K 5/34; C08K 5/49

[58] Field of Search .......... 260/45.7 PS, 79, 897 R, 260/928

[56] References Cited

UNITED STATES PATENTS

| | | | |
|---|---|---|---|
| 2,736,737 | 2/1956 | Morris | 260/928 |
| 3,016,363 | 1/1962 | Tholstrup et al. | 260/45.8 |
| 3,210,319 | 10/1965 | Huhn et al. | 260/45.8 |
| 3,239,484 | 3/1966 | Stark | 260/45.9 |
| 3,244,667 | 4/1966 | Burgess | 260/45.75 |
| 3,278,483 | 10/1966 | Wright et al. | 260/45.85 |
| 3,356,770 | 12/1967 | Larrison | 260/930 |
| 3,424,715 | 1/1969 | Kopacki et al. | 260/45.9 |
| 3,496,128 | 2/1970 | Casey et al. | 260/23 |
| 3,666,837 | 5/1972 | Rattenbury | 260/928 |
| 3,692,879 | 9/1972 | Rattenbury et al. | 260/928 |

*Primary Examiner*—Donald E. Czaja
*Assistant Examiner*—R. A. White
*Attorney, Agent, or Firm*—Cushman, Darby & Cushman

[57] ABSTRACT

Polymers, most preferably mono-olefin polymers, are stabilized by the mixture of an ultraviolet light stabilizer and a thiophosphite of the formula

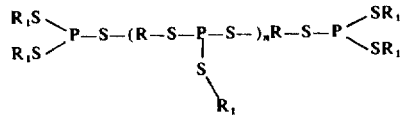

where $n$ is 0 or an integer, R is a divalent aromatic, aliphatic or cycloaliphatic group and $R_1$ is hydrocarbyl or halohydrocarbyl. Less preferably, there can be used compounds of the formula

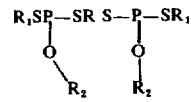

where $R_1$ and R are as defined above and $R_2$ is aryl or haloaryl.

2 Claims, No Drawings

THIOPHOSPHITES AND ULTRAVIOLET LIGHT STABILIZER FOR OLEFIN POLYMERS

The present invention relates to the combination of certain thiophosphites with ultraviolet light stabilizers to provide improved stability to ultraviolet light.

In Rattenbury application Ser. No. 836,150, filed June 24, 1969 now U.S. Pat. No. 3,666,837, there are disclosed new thiophosphites of the formula

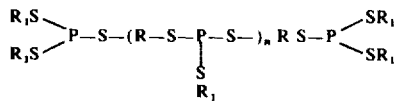

where $n$ is zero or an integer, preferably not over 9, R is a divalent aromatic, aliphatic or cycloaliphatic group, $R_1$ is alkyl, haloalkyl, aryl, haloaryl, alkenyl, haloalkenyl, cycloalkyl or aralkyl. The $R_1$ groups can be the same or different. The entire disclosure of the Rattenbury application is hereby incorporated by reference.

In the Rattenbury application the thiophosphites have been disclosed as having a number of uses, including the use as antioxidants. It has now been found that the thiophosphite compounds are particularly valuable when in admixture with ultraviolet light absorbers to provide increased light stabilization. Apparently some type of synergistic action is present since the improved light stability cannot be accounted for by the light stability of polymers having the individual components therein.

Examples of thiophosphites useful in the present invention are tetrakis (mercaptoethyl) 1,2-dimercaptoethylene diphosphite, tetrakis (mercaptohexyl) 1,2-dimercaptoethylene diphosphite, tetrakis (mercaptolauryl) 1,2-dimercaptoethylene diphosphite, tetrakis (mercaptobutyl) 1,2-dimercaptopropylene diphosphite, tetrakis (mercaptoisopropyl) 1,3-dimercaptopropylene diphosphite, tetrakis (mercaptomethyl) 1,6-dimercaptohexylene diphosphite, di(mercaptoethyl) di(mercaptopropyl) 1,6-dimercaptohexylene diphosphite, tetrakis (mercapto t-butyl) 1,6-dimercaptohexylene diphosphite, tetrakis (mercapto sec. butyl) 1,6-dimercaptohexylene diphosphite, tetrakis (mercaptohexyl) 1,6-dimercaptohexylene diphosphite, tetrakis (mercapto-2-ethylhexyl) 1,6-dimercaptohexylene diphosphite, tetrakis (mercaptolauryl) 1,6-dimercaptohexylene diphosphite, tetrakis (mercaptodecyl) 1,6-dimercaptohexylene diphosphite, mercaptononyl mercaptodecyl mercaptolauryl mercaptotetradecyl 1,6-dimercaptohexylene diphosphite, tetrakis (mercaptohexadecyl) 1,6-dimercaptohexylene diphosphite, tetrakis (mercaptoisodecyl) 1,6-dimercaptohexylene diphosphite, tetrakis (mercaptooctadecyl) 1,6-dimercaptohexylene diphosphite, tetrakis (mercaptoeicosanyl) 1,6-dimercaptohexylene diphosphite, tetrakis (mercaptobenzyl) 1,6-dimercaptohexylene diphosphite, tetrakis (mercaptocyclopentyl) 1,6-dimercaptohexylene diphosphite, tetrakis (mercaptocyclohexyl) 1,6-dimercaptohexylene diphosphite, tetrakis (2-mercaptomethylcyclohexyl) 1,6-dimercaptohexylene diphosphite, tetrakis (2-mercapto methylcyclohexyl) 1,6-dimercaptohexylene diphosphite, tetrakis (2-chloro-1-mercaptoethyl) 1,6-dimercaptohexylene diphosphite, tetrakis (3-chloro-1-mercaptopropyl) 1,6-dimercaptohexylene diphosphite, tetrakis (mercapto alpha terpinyl) 1,6-dimercaptohexylene diphosphite, tetrakis (5-mercaptopyridyl) 1,6-dimercaptohexylene diphosphite, tetrakis (mercaptothienyl) 1,6-dimercaptohexylene diphosphite, tetrakis (4-bromo-1-mercaptobutyl) 1,6-dimercaptohexylene diphosphite, tetrakis (mercaptophenyl) 1,6-dimercaptohexylene diphosphite, di(mercaptodecyl) di(mercaptophenyl) 1,6-dimercaptohexylene diphosphite, tetrakis (2-chloroallylmercapto) 1,6-dimercaptohexylene diphosphite, tetrakis (4-methyl-1-mercaptophenyl) 1,6-dimercaptohexylene diphosphite, tetrakis (2,6-dimethyl-1-mercaptophenyl) 1,6-dimercaptohexylene diphosphite, tetrakis (2,4,6-trimethyl-1-mercaptophenyl) 1,6-dimercaptohexylene diphosphite, tetrakis (4-butyl-1-mercaptophenyl) 1,6-dimercaptohexylene diphosphite, tetrakis (2-octyl-1-mercaptophenyl) 1,6-dimercaptohexylene diphosphite, tetrakis (4-nonyl-1-mercaptophenyl) 1,6-dimercaptohexylene diphosphite, tetrakis (3-dodecyl-1-mercaptophenyl) 1,6-dimercaptohexylene diphosphite, tetrakis (2-bromo-1-mercaptophenyl) 1,6-dimercaptohexylene diphosphite, tetrakis (3-bromo-1-mercaptophenyl) 1,6-dimercaptohexylene diphosphite, tetrakis (mercaptolauryl) 1,4-dimercaptobutylene diphosphite, tetrakis (mercaptophenyl) 1,6-dimercaptoeicosanylene diphosphite, tetrakis (mercaptodecyl) 1,20-dimercaptoeicosanylene diphosphite, tetrakis (mercaptolauryl) $\beta,\beta'$-dimercapto ethyl ether diphosphite, tetrakis (4-nonyl-1-mercaptophenyl) 3,3'-dimercaptopropyl ether diphosphite, tetrakis (mercaptoisodecyl) 1,4-dithiobutene-2 diphosphite, tetrakis (mercaptoallyl) 1,6-dimercaptohexylene diphosphite, tetrakis (mercaptooleyl) 1,6-dimercaptohexylene diphosphite, tetrakis (mercaptocetyl) 2,2'-dimercaptoethyl thioether diphosphite, tetrakis (mercaptoisodecyl) dimercaptodiethylene glycol diphosphite, tetrakis (mercaptophenyl) dimercapto dipropylene glycol diphosphite, tetrakis (4-nonyl-1-mercaptophenyl) dimercapto tetraethylene glycol diphosphite, tetrakis (mercaptolauryl) omega, omega' dimercaptooctyl ether diphosphite, tetrakis (mercaptolauryl) omega, omega' dimercaptooctyl thioether diphosphite, tetrakis (mercaptolauryl) 2,9-dimercapto-p-menthylene diphosphite, tetrakis (mercaptophenyl) 2,9-dimercapto-p-menthylene diphosphite, tetrakis (alphamercaptonaphthyl) 2,9-dimercapto-p-menthylene diphosphite, tetrakis (mercaptolauryl) 2,5-dimercapto pyridine diphosphite, tetrakis (mercaptooctyl) 2,4-dimercapto thiophene diphosphite, tetrakis (mercaptolauryl) p-dimercaptophenylene diphosphite, tetrakis (o-octyl mercaptophenyl) p-dimercaptophenylene diphosphite, tetrakis (mercaptolauryl) 2-methyl-1,4-dimercaptophenylene diphosphite, tetrakis (mercaptocetyl) dimercapto cyclohexylene diphosphite, tetrakis (mercaptolauryl) isopropylidene bis(4-mercaptobenzene) diphosphite, tetrakis (mercaptophenyl) isopropylidene bis(4-mercaptobenzene) diphosphite, tetrakis (mercaptolauryl) 1,4-bis (mercaptomethyl) benzene diphosphite, tetrakis (mercaptolauryl) 1,4-bis(mercaptomethyl) cyclohexane diphosphite, tetrakis (mercaptolauryl) 1,3-dimercaptocyclopentylene diphosphite, tetrakis (mercaptolauryl) 1,8-dimercaptonaphthalene diphosphite, pentakis (dodecylmercapto) bis(1,6-hexylenedimercapto) triphosphite, pentakis (phenylmercapato) bis(1,6-hexylenedimercapto) triphosphite, tris(dodecylmercapto) bis(p-nonylphenylmercapto) bis(1,6-hexylenedimercapto) triphosphite, pentakis (octadecylmercapto) bis(1,2-ethylenedimercapto) triphosphite, pentakis (dodecylmercapto) bis 2,9-p-menthylenedimercapto triphosphite, pentakis (isodecylmercapto) bis(β,β'-dimercaptoethyl ether) triphosphite, hexakis (dodecylmercapto) tris(1,6-hexylenedimercapto) tetraphosphite, heptakis(dodecylmercapto) tetrakis(1,6-hexylene dimercapto) pentaphosphite dodecakis(laurylmercapto) nonakis(1,6-hexylene dimercapto) decaphosphite, dodecakis (phenylmercapto) nonakis(1,2-ethylene dimercapto) decaphosphite, dodecakis (decylmercapto) nonakis(2,9-p-menthylene dimercapto) decaphosphite, tetrakis(mercaptobutyl) 1,4-dimercaptobutylene diphosphite, tetrakis(mercaptobutyl) 1,8-dimercaptooctylene diphosphite, tetrakis(mercaptolauryl) ethylene diphosphite, tetrakis(mercaptophenyl) butylene diphosphite, tetrakis(mercaptooctyl) diethylene glycol diphosphite, tetrakis (p-nonyl mercaptophenyl) dipropylene glycol diphosphite, tetrakis (p-octadecyl mercaptophenyl) 1,6-dimercaptohexylene diphosphite.

Unless otherwise indicated all parts and percentages are by weight.

In addition to the compounds disclosed in the Rattenbury application Ser. No. 836,150, less preferably there can also be used in the present invention in combination with the ultraviolet light absorbers compounds of the formula

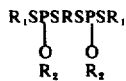

where R and R₁ are as defined above and R₂ is aryl or haloaryl. The compounds of this latter type are disclosed in Rattenbury and Larrison application, Ser. No. 3,247 filed Jan. 15, 1970, entitled "O,S-Diphosphites" now U.S. Pat. No. 3,692,879. The entire disclosure of the Rattenbury and Larrison application is hereby incorporated by reference.

Examples of useful O,S-diphosphites in the present invention are diphenyl di(mercaptoethyl) 1,2-dimercaptoethylene diphosphite (having the formula

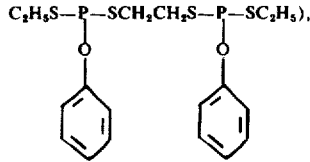

diphenyl di(mercaptohexyl) 1,2-dimercaptoethylene diphosphite, diphenyl di(mercaptolauryl) 1,2-dimercaptoethylene diphosphite, diphenyl di(mercaptobutyl) 1,2-dimercaptopropylene diphosphite, diphenyl di(mercaptoisopropyl) 1,3-dimercaptopropylene diphosphite, diphenyl di(mercaptomethyl) 1,6-dimercaptohexylene diphosphite, phenyl p-tolyl mercaptoethyl mercaptopropyl 1,6-dimercaptohexylene diphosphite, diphenyl di(mercapto t-butyl) 1,6-dimercapto hexylene diphosphite, diphenyl (mercapto sec. butyl) 1,6-dimercaptohexylene diphosphite, diphenyl di(mercaptohexyl) 1,6-dimercaptohexylene diphosphite, diphenyl di(mercapto 2-ethylhexyl) 1,6-dimercaptohexylene diphosphite, diphenyl di(mercaptolauryl) 1,6-dimercaptohexylene diphosphite, diphenyl di(mercaptodecyl) 1,6-dimercaptohexylene diphosphite, diphenyl di-mercaptohexadecyl) 1,6-dimercaptohexylene diphosphite, diphenyl di(mercaptoisodecyl) 1,6-dimercaptohexylene diphosphite, diphenyl di(mercaptooctadecyl) 1,6-dimercaptohexylene diphosphite, diphenyl di(mercaptoeicosanyl) 1,6-dimercaptohexylene diphosphite, diphenyl di(mercaptobenzyl) 1,6-dimercaptohexylene diphosphite, diphenyl di(mercaptocyclopentyl) 1,6-dimercaptohexylene diphosphite, diphenyl di(mercaptocyclohexyl) 1,6-dimercaptohexylene diphosphite, diphenyl di(3-mercaptomethylcyclohexyl) 1,6-dimercaptohexylene diphosphite, diphenyl di(4-mercaptomethylcyclohexyl) 1,6-dimercaptohexylene diphosphite, diphenyl di(2-chloro-1-mercaptoethyl) 1,6-dimercaptohexylene diphosphite, diphenyl di(3-chloro-1-mercaptopropyl) 1,6-dimercaptohexylene diphosphite, diphenyl di(mercapto alpha terpinyl) 1,6-dimercaptohexylene diphosphite, diphenyl di(5-mercaptopyridyl) 1,6-dimercaptohexylene diphosphite, diphenyl di(mercaptomethyl) 1,6-dimercaptohexylene diphosphite, diphenyl di(4-bromomercaptobutyl) 1,6-dimercaptohexylene diphosphite, diphenyl di(mercaptophenyl) 1,6-dimercaptohexylene diphosphite, diphenyl di(mercaptoallyl) 1,6-dimercaptohexylene diphosphite, diphenyl di(mercapto 2-chloroallyl) 1,6-dimercaptohexylene diphosphite, diphenyl di(4-methyl-1-mercaptophenyl) 1,6-dimercaptohexylene diphosphite, diphenyl di(2,6-dimethyl-1-mercaptophenyl) 1,6-dimercaptohexylene diphosphite, diphenyl di(2,4,6-trimethyl-1-mercaptophenyl) 1,6-dimercaptohexylene diphosphite, diphenyl di(4-butyl-1-mercaptophenyl) 1,6-dimercaptohexylene diphosphite, diphenyl di(2-octyl-1-mercaptophenyl) 1,6-dimercaptohexylene diphosphite, diphenyl di(4-nonyl-1-mercaptophenyl) 1,6-dimercaptohexylene diphosphite, diphenyl di(3-dodecyl-1-mercaptophenyl) 1,6-dimercaptohexylene diphosphite, diphenyl di(2-bromo-1-mercaptophenyl) 1,6-dimercaptohexylene diphosphite, diphenyl di(4-bromo-1-mercaptophenyl) 1,6-dimercaptohexylene diphosphite, diphenyl di(mercaptolauryl) 1,4-dimercaptobutylene diphosphite, diphenyl di(mercaptophenyl) 1,6-dimercaptoeicosanylene diphosphite, diphenyl di(mercaptodecyl) 1,20-dimercaptoeicosanylene diphosphite, diphenyl di(mercaptolauryl) β,β'-dimercapto ethyl ether diphosphite, diphenyl di(4-nonyl-1-mercaptophenyl) 3,3'-dimercapto propyl ether diphosphite, diphenyl di(mercaptoisodecyl) 1,4-dithiobutene-2 diphosphite, diphenyl di(mercaptooleyl) 1,6-dimercaptohexylene diphosphite, diphenyl di(mercaptocetyl) 2,2'-dimercaptoethyl ether diphosphite, diphenyl di(mercaptoisodecyl) dimercapto butylene glycol diphosphite, diphenyl di(mercaptophenyl) dimercapto dipropylene glycol diphosphite, diphenyl di(4-nonyl-1-mercaptophenyl) dimercapto tetraethylene glycol diphosphite, diphenyl di(mercaptolauryl) omega, omega' dimercaptooctylthioether diphosphite, diphenyl di(mercaptolauryl) omega, omega' dimercaptooctylether diphosphite, diphenyl di(mercaptolauryl) 2,9-dimercapto-p-menthylene diphosphite, diphenyl di(mercaptophenyl) 2,9-dimercapto-p-menthylenediphosphite, diphenyl di(alpha mercaptonaphthyl) 2,9-dimercapto-p-menthylene diphosphite, diphenyl di(mercaptolauryl) 2,5-dimercapto pryridine diphosphite, diphenyl di(mercaptooctyl) 2,4-dimercaptothiophene diphosphite, diphenyl di(mercaptolauryl) p-dimercaptophenylene diphosphite, diphenyl di(o-octyl mercaptophenyl) p-dimercaptophenyl diphosphite, diphenyl di(mercaptolauryl) 2-methyl-1,4-dimercaptocyclohexylene diphosphite, diphenyl di(mercaptocetyl) 1,4-dimercaptocyclohexylene diphosphite, diphenyl di(mercaptolauryl) isopropylidene bis(4-mercaptobenzene) diphosphite, diphenyl di(mercaptophenyl) isopropylidene bis(4-mercaptobenzene) diphosphite, diphenyl di(mercaptolauryl) 1,4-bis(mercaptomethyl) benzene diphosphite, diphenyl di(mercaptolauryl) 1,4-bis(mercaptomethyl) cyclohexane diphosphite, diphenyl di(mercaptolauryl) 1,3-dimercaptocyclopentylene diphosphite, diphenyl di(mercaptolauryl) 1,8-di(mercaptonaphthalene)diphosphite, di(p-tolyl) di(mercaptolauryl) 1,2-dimercaptoethylene diphosphite, di(otolyl) di(mercaptophenyl) 1,6-dimercaptohexylene diphosphite, di(p-nonylphenyl) di(mercaptolauryl) 1,6-dimercaptohexylene diphosphite, di(2,6-xylenyl) di(mercaptooctyl) 1,2-dimercaptooctyl) 1,2-dimercaptoethylene diphosphite, di(3-chlorophenyl) di(mercaptolauryl) 1,2-dimercaptoethylene diphosphite, di(2,4-dichlorophenyl) di(mercaptocyclohexyl) 1,6-dimercaptohexylene diphosphite, di(2,4,5-trichlorophenyl) di(mercaptolauryl) 1,2-dimercaptoethylene diphosphite, di(2-chloro-4-methylphenyl) di(mercaptolauryl) 1,2-dimercaptoethylene diphosphite, di(α-naphthyl) di(mercaptoisooctyl) 1,2-dimercaptoethylene diphosphite, di(4-fluorophenyl) di(mercaptolauryl) 1,2-dimercaptoethylene diphosphite.

Examples of suitable ultraviolet light absorbers include benzophenones such as 2-hydroxy-4-methoxybenzophenone, 2,4-dihydroxy-benzophenone, 2,2'-dihydroxy-4-methoxy-benzophenone, 2,2'-dihydroxy-4-n-octoxy-benzophenone, 2-hydroxy-4-n-octoxybenzophenone (Cyasorb 531), 2-hydroxy-4-butoxybenzophenone, 4'-chloro-2-hydroxy-4-octoxybenzophenone, 5-chlor-2-hydroxy-benzophenone, 2,4-dibenzoyl resorcinol, 4-dodecyloxy-2-hydroxybenzophenone, 2,2'-dihydroxy, 4,4'-dimethoxybenzophenone, 2,2',4,4'-tetrahydroxybenzophenone, 2-hydroxy-4-methoxybenzophenone-5-sulfonic acid, sodium 2,2'-dihydroxy-4,4'-dimethoxy-5-sulfobenzophenone, 2,2'-dihydroxy-4-butoxybenzophenone, 2,2'-dihydroxy-4-dodecoxybenzophenone, 2-hydroxy-4-octadecoxybenzophenone, 2,2'-dihydroxy-4,4-ethoxy benzophenone, 2,2'-dihydroxy-4-heptadecoxy-benzophenone, 2-hydroxy-4-n-heptoxy-benzophenone, 2-hydroxy-4-methoxy-2'-carboxybenzophenone 2-hydroxy-4-(2-hydroxy-3-methylacryloxy) propoxy benzophenone, 2-hydroxy-4-methoxy-4'-methyl benzophenone, salicylates such as phenyl salicylate, 4-t-butylphenyl salicylate, 4-octyl-phenyl salicylate, bisphenol A disalicylate, carboxyphenyl salicylate, strontium salicylate, methyl salicylate, dodecyl salicylate, resorcylates such as resorcinol monobenzoate, benzylidene malonates such as diethyl p-methoxybenzylidene malonate, dimethyl-p-methoxybenzylidene malonate, diethyl o-methoxybenzylidene malonate, diethyl p-hydroxybenzylidene malonate, benzotriazoles such as 2-hydroxy-phenylbenzotriazole and alkyl substituted derivatives thereof, 2(2'-hydroxy-5'-methyl phenyl) benzotriazole (Tinuvin P), 2-cyanostilbyl-4-naphthotriazole, 2(-2-hydroxy-5-ethyl phenyl) benzotriazole, 2(-2-hydroxy-5-octyl phenyl) benzotriazole, Tinuvin 328 (a substituted benzotriazole), 2(2'-hydroxy-3',5'-di-t-butylphenyl) chlorobenzo triazole (Tinuvin 327), 2(2'-hydroxy-3'-di-t-butyl-5'-methylphenyl) Chlorobenzotriazole (Tinuvin 326), 2-(2'-hydroxy-4'-methoxyphenyl) benzotriazole, 2-(2'-hydroxy-3',5'-di-t-amylphenyl) benzotriazole, 2-(2'-hydroxy-3',5'-di-t-butylphenyl)-5-chlorobenzotriazole, substituted acrylonitriles of the formula

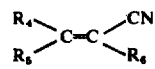

where $R_4$ and $R_5$ are alkyl or aryl and $R_6$ is an electronegative substituent such as ethyl 2-cyano-3,3-diphenyl acrylate, 2-ethylhexyl-2-cyano3,3-diphenyl acrylate, α-phenylbenzylidene-malononitrile, diphenylbenzylidene-malononitrile, metal (particularly nickel) organic complexes such as Ferro AM 101 (nickel complex of the formula

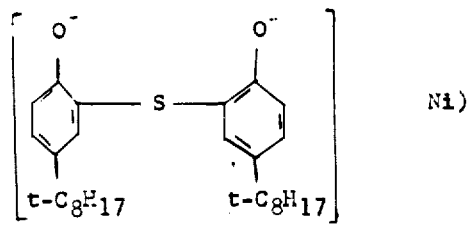

Cyasorb UV 1084 (nickel complex of the formula

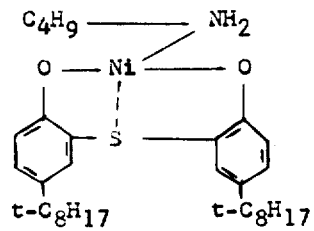

also called 2,2'-thiobis-(4-t-octylphenolate) n-butylamine nickel) nickel, bis(octylphenyl sulfide).

There can also be used triazines such as those having at least one o-hydroxyphenyl substituent such as 2,4,6-tris-(2-hydroxy-4-octyloxy-phenyl)-s-triazine, 2-(2-hydroxy-4-octyloxyphenyl)-4,6-dixylyl-s-triazine, benzothiazoles such as 2-anilinobenzo thiazole, 2-(N-methylanilino) benzothiazole, 2-(4-methoxyanilino) benzothiazole, 2-(2-methoxylphenylimino) 3-ethyl-benzothiazoline, 2-phenylimino-3-ethylbenzothiazoline and 2-(β-naphthylimino) benzothiazoline, arylaminoethylenes such as N-methyl p-methoxyanilinomethylenemalonitrile, diphenylaminomethylenemalononitrile, N-methyl-p-methoxyanilinomethylmalononitrile, guanidines such as 1,2-dibenzoyl-3-arylguanidines, e.g. 1,2-dibenzoyl-3-(p-methoxyphenyl) guanidine; 1,2-dibenzoyl-3-(p-chlorophenyl) guanidine, 1,2-di(p-methoxybenzoyl)-3-(p-methoxyphenyl) guanidine.

There can be used any of the ultraviolet light absorbers disclosed in Di Giaimo U.S. Pat. No. 3,496,134 issued Feb. 17, 1970, or any of the patents referred to therein on col. 3 lines 40 to col. 4 line 33. The entire disclosure of Di Giaimo and of all the patents cited therein, namely, U.S. Pat. Nos. 2,777,838; 2,682,559; 2,693,492; 2,861,053; 2,919,259; 2,976,259; 3,006,959; 3,098,842; 3,004,896; 3,018,269; 3,271,339; 3,146,217; 3,118,887; 3,293,247; 3,293,249; 3,244,668; 3,079,336; 3,074,971; 3,085,097; 3,111,417; 3,149,146; 3,215,724 and 3,278,448 is hereby incorporated by reference.

The thiophosphites and the ultraviolet light absorber are each used in an amount of 0.005 to 10 parts per 100 parts of polymer to be stabilized, preferably 0.1 to 5 parts per 100 parts of polymer. The thiophosphite and ultraviolet light absorber can be used in equal amount or either can be in excess, e.g. in a ratio of thiophosphite to ultraviolet light absorber of from 0.1 to 1 up to 10:1.

The ultraviolet light stabilizer compositions of the present invention are useful with many different kinds of solid polymers. Thus they can be used with resins made from vinylidene compounds such as vinyl chloride, vinylidene chloride, vinyl chloroacetate, chlorostyrenes, vinyl bromide and chlorobutadienes.

Such vinylidene compounds may be polymerized alone or in admixture with each other or with vinylidene compounds free from halogen. Among the halogen free materials which can be copolymerized with the halogen containing vinylidene compounds, e.g. vinyl chloride, are vinyl esters of carboxylic acids, e.g. vinyl acetate, vinyl propionate, vinyl butyrate and vinyl benzoate, esters of unsaturated acids, e.g., alkyl and alkenyl acrylates such as methyl acrylate, ethyl acrylate, propyl acrylate, butyl acrylate and allyl acrylate as well as the corresponding methacrylates, e.g. methyl methacrylate and butyl methacrylate, vinyl aromatic compounds, e.g. styrene, p-ethyl styrene, divinyl benzene, vinyl naphthalene, α-methyl styrene, p-methyl styrene, dienes such as butadiene and isoprene, unsaturated amides such as acrylamide, methacrylamide and acrylanilide and the esters of α,β-unsaturated carboxylic acids, e.g., the methyl, ethyl, propyl, butyl, amyl, hexyl, heptyl, octyl, allyl, methallyl and phenyl esters of maleic, crotonic, itaconic and fumaric acids and the like. Specific examples of such esters are diethyl maleate, dibutyl maleate and dibutyl fumarate.

The copolymers in which at least 50% of the copolymer is made from a halogen containing vinylidene compound such as vinyl chloride are preferably treated according to the invention.

The stabilizers of the present invention are also effective when intimately mixed with halogen containing resins in which part or all of the halogen is introduced into a preformed resin, e.g. chlorinated polyvinyl acetate, chlorinated polystyrene, chlorinated polyethylene, chlorinated polyvinyl chloride, chlorinated natural and synthetic rubbers and rubber hydrochloride.

Typical examples of copolymers include vinyl chloride-vinyl acetate (95:5 weight ratio), vinyl chloridevinyl acetate (87:13 weight ratio), vinyl chloride-vinyl acetate-maleic anhydride (86:13:1 weight ratio), vinyl chloride-vinylidene chloride (95:5 weight ratio), vinyl chloride-diethyl fumarate (95:5 weight ratio), vinyl chloride-trichloroethylene (95:5 weight ratio).

The resin, e.g. polyvinyl chloride, can either be plasticized or unplasticized. As the plasticizer there can be employed conventional materials such as dioctyl phthalate, octyl decyl phthalate, tricresyl phosphate, 2-ethylhexyl diphenyl phosphate, dodecyl dicresyl phosphate, tributyl acetyl citrate, dioctyl sebacate, dibutyl sebacate, etc. The plasticizer is used in conventional amount, e.g. 10 to 100 parts for each 100 parts of the vinyl chloride containing resin.

There can also be incorporated 0.1 to 10 parts per 100 parts of the halogen containing resin of a metal salt stabilizer. Thus, there can be used barium, strontium, calcium, cadmium, zinc, lead, tin, magnesium, cobalt, nickel, titanium and aluminum salts of phenols, aromatic carboxylic acids, fatty acids and epoxy fatty acids.

Examples of suitable salts include barium di(nonylphenolate), strontium di(nonylphenolate), strontium di(amylphenolate), barium di(octylphenolate), strontium di(octylphenolate), barium di(nonyl-o-cresolate), lead di(octylphenolate), cadmium-2-ethylhexoate, cadmium laurate, cadmium stearate, zinc caprylate, cadmium caproate, barium stearate, barium 2-ethylhexoate, barium laurate, barium ricinoleate, lead stearate, aluminum stearate, magnesium stearate, calcium octoate, calcium stearate, cadmium naphthenate, cadmium benzoate, cadmium P-tert. butylbenzoate, barium octyl salicylate, cadmium epoxy stearate, strontium epoxy stearate, cadmium salt of epoxidized acids of soybean oil, and lead epoxy stearate.

In plastisol formulations there is preferably also included from 0.1 to 10 parts per 100 parts of resin of an epoxy vegetable oil such as epoxidized soybean oil or epoxidized tall oil.

The ultraviolet light stabilizers of the present invention are particularly effective as polyethylene, polypropylene, ethylene propylene copolymers (e.g. 50:50, 80:20 and 20:80), ethylene-monoolefin copolymers wherein the monoolefin has 4–10 carbon atoms and is present in a minor amount, e.g. ethylene-butene-1 copolymer (95:5) and ethylenedecene-1 copolymer (90:10). Furthermore, they can be used to stabilize natural rubber, styrene-butadiene rubber (SBR rubber), e.g. (75% butadiene-25% styrene), EPDM rubbers, ABS terpolymers (e.g. 20–30% acrylonitrile, 20–30% butadiene, 40–60% styrene), polyisoprene, polybutadiene, styrene-acrylonitrile copolymers butyl rubber, polyacrylonitrile and acrylonitrile copolymers (e.g. acrylonitrile-vinyl chloride 85:15), polystyrene, impact modified polystyrene, butadieneacrylonitrile (e.g. 60:40); polymerized acrylates and methacrylate, e.g. polymethyl acrylate polymethyl methacrylates and polybutyl acrylate, polyacetals, e.g. polyoxymethylene polymers (e.g. Delrin and Celcon), polycarbonates (e.g. bisphenol A-carbonate polymer), polysulfones, polyphenyleneoxides, phenoxy resins, epoxy resins, A-epichlarhydrin, nylon, cellulose acetate, cellulose acetatepropionate, cellulose acetate-butyrate, cellulose nitrate, ethyl cellulose, linear polyesters, e.g. polyethylene terephthalate (Dacron, Mylar), unsaturated polyesters, e.g. vinyl compounds modified alkyds such as ethylene glycol phthalate-maleate modified with styrene or diallyl phthalate, oil modified alkyd resins, e.g. soybean oil-glyceryl phthalate resin, chlorosulfonated polyethylene, polyurethanes (e.g. toluene diisocyanate reaction products with polypropylene glycol molecular weight 2025 or with glycerine-ethylene oxide adduct having a hydroxyl number of 56.

As the EPDM rubber there can be employed many of the commercially available EPDM rubbers. The EPDM rubber normally contains 30 to 70 molar percent (preferably 50 to 60 molar percent) of ethylene, 65 to 20 molar percent (preferably 35 to 45 molar percent) propylene and 1 to 15 molar percent (preferably 3 to 5 molar percent) of the nonconjugated polyolefin. Usually the polyolefin is not over 10 molar percent. The ethylene and propylene can each be 5 to 95 molar percent of the composition.

As used in the present specification and claims, the term nonconjugated polyolefin includes aliphatic nonconjugated polyene hydrocarbons and cycloaliphatic nonconjugated polyene hydrocarbons, e.g., endocyclic dienes. Specific examples of suitable nonconjugated polyolefins include pentadiene-1,4; hexadiene-1,4;

dicyclopentadiene, methyl cyclopentadiene dimer, cyclododecatriene, cyclooctadiene-1,5; 5-methylene-2-norbornene.

Specific examples of suitable terpolymers are the Royalenes which contain 55 mole percent ethylene, 40 to 42 mole percent propylene and 3 to 5 mole percent dicyclopentadiene; Enjay terpolymers, e.g., ERP-404 of Enjay and Enjay 3509 which contains about 55 mole percent ethylene, 41 mole percent propylene and 4 mole percent 5-methylene-2-norbornene; Nordel, a terpolymer of 55 mole percent ethylene, 40 mole percent propylene and 5 mole percent hexadiene-1,4. Another suitable terpolymer is the one containing 50 mole percent ethylene, 47 mole percent propylene and 3 mole percent 1,5-cyclooctadiene (Dutrel).

Examples of EPDM rubbers are given in U.S. Pat. Nos. 2,933,480; 3,000,866; 3,063,073; 3,093,620; 3,093,621, and 3,136,739, in British Patent No. 880,904 and in Belgian Patent No. 623,698.

There can also be incorporated non sulfur containing phosphites in an amount of 0.1 to 10 parts per 1000 parts of polymer. Typical of such phosphites are triphenyl phosphite, tris decyl phosphite, decyl diphenyl phosphite, di(p-t-butylphenyl) phenyl phosphite, diphenylo-cresyl phosphite, trioctyl phosphite, tricresyl phosphite, tribenzyl phosphite, polymeric phosphites such as Weston 243-B (made in accordance with U.S. Pat. No. 3,341,629) and prepared from triphenyl phosphite and hydrogenated bisphenol and having a molecular weight of about 3000 and Weston 440 (a linear polymeric pentaerythritol hydrogenated bisphenol A phosphite made in accordance with U.S. Pat. No. 3,053,878, Weston WX 618-(distearyl pentaery thritol diphosphites), thiophosphites such as trilauryl trithiophosphite and tristearyl trithiophosphite.

There can also be included other thio compounds in an amount of 0.01 to 10%, usually 0.1 to 5% of the polymer. Thus, there can be used pentaerylthritol tetra (mercaptoacetate), 1,1,1-trimethylolethane tri (mercaptoacetate), 1,1,1-trimethylolpropane tri (mercaptoacetate), dioleyl thiodipropionate, dilauryl thiodipropionate, other thio compounds include distearyl 3,3'-thiodipropionate, dicyclohexyl - 3,3' - thiodipropionate, dicetyl-3,3'-thiodipropionate, dioctyl-3,3'-thiodipropionate, dibenzyl-3,3'-thiodipropionate, lauryl myristyl-3,3'-thiodipropionate, diphenyl - 3,3' - thiodipropionate, di-p-methoxyphenyl-3,3'-thiodipropionate, didecyl - 3,3' - thiodipropionate, dibenzyl - 3,3' - thiodipropionate, diethyl-3,3'-thiodipropionate, lauryl ester of 3-methyl-mercapto propionic acid, lauryl ester of 3-butyl-mercapto propionic acid, lauryl ester of 3-lauryl-mercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy) phenylmercapto propionic acid, lauryl ester of 3-cyclohexylmercapto propionic acid, lauryl ester of 3-hydroxymethylmercaptopropionic acid, myristyl ester of 3-hydroxyethylmercapto propionic acid, octyl ester of 3-methoxymethylmercapto propionic acid, dilauryl ester of 3-carboxylmethylmercapto propionic acid, dilauryl ester of 3-carboxypropylmercapto propionic acid, dilauryl-4,7-dithiasebacate, dilauryl - 4,7,8,11 - tetrathiotetradecandioate, dimyristyl-4,11-dithiatetradecandioate, lauryl-3-benzothiazylmercaptopropionate. Preferably the esterifying alcohol is an alkanol having 10 to 18 carbon atoms. Other esters of beta thiocarboxylic acids set forth in Gribbins U.S. Pat. No. 2,519,744 can also be used.

Likewise, there can be included 0.01–10%, usually 0.1–5%, metal salt stabilizer in the monoolefin polymer formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate, magnesium stearate as well as zinc stearate, cadmium laurate, cadmium octoate, cadmium stearate and the other polyvalent metal salts of fatty acids set forth previously.

There can also be added phenolic antioxidants in an amount of 0.01–10%, preferably 0.1–5%. Examples of such phenols include 2,6-di-t-butyl-p-cresol (Ionol), butylated hydroxyanisole, propyl gallate, 4,4'-thiobis(6-t-butyl-m-cresol), 4,4'-cyclohexylidene diphenol, 2,5-di-t-amyl hydroquinone, 4,4'-butylidene bis(6-t-butyl-m-cresol), hydroquinone monobenzyl ether, 2,2'-methylene-bis(4-methyl-6-t-butylphenol) (Catalin 14), 2,6-butyl-4-decyloxyphenol, 2-t-butyl-4-dodecyloxyphenol, 2-t-butyl-4-octadecyloxyphenol, 4,4'-methylene-bis(2,6-di-t-butyl phenol), p-aminophenol, N-lauryloxy-p-aminophenol, 4,4'-thiobis(3-methyl - 6 - t-butylphenol), bis [o-(1,1,3,3-tetramethylbutyl)phenol] sulfide, 4-acetyl - $\beta$ -resorcylic acid, A stage p-t-butylphenolformaldehyde resin, crotonaldehyde condensate of 3-methyl-6-t-butyl-phenol, 2,6-di-t-butyl p-cresol (Toponol CA), 2,2-methylene bis 4-ethyl-6-t-butylphenol (AO-425), 4-dodecyloxy-2-hydroxybenzophenone, 3-hydroxy-4-(phenylcarbonyl)phenyl palmitate, n-dodecyl ester of 3-hydroxy-4-(phenylcarbonyl) phenoxyacetic acid, and t-butylphenol.

The use of epoxy compounds in an amount of 0.01–5% in the polymer compositions is also valuable. Examples of such epoxy compounds include epoxidized soya bean oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrinbisphenol A resins (epichlorhydrindiphenylolpropane resins), phenoxy-propylene oxide, butoxypropylene oxide, epoxidized neopentylene oleate, glycidyl epoxystearate, epoxidized $\alpha$-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidol ether of 1,5-dihydroxynaphthalene, epoxidized linseed oil fatty acids, allyl glycidyl ether, butyl glycidyl ether, cyclohexane oxide, 4-(2,3-epoxypropoxy) acetophenone, mesityl oxide epoxide, 2-ethyl-3-propyl glycidamide, glycidyl ethers of glycerine, pentaerythritol and sorbitol, and 3,4-epoxycyclohexane-1,1-dimethanol bis-9,10-epoxystearate.

In the examples, Irganox 1076 is a commercially available hindered phenol, specifically octadecyl 3-(3,5-di-tert-butyl-4-hydroxyphenyl)proprionate.

The polypropylene used in the following examples was Hercules Profax 6501, an unstabilized polypropylene.

EXAMPLE 1

A formulation was made by compounding in a Banbury mixer 100 parts of the polypropylene, 0.1 part of calcium stearate, 0.1 part of Irganox 1076, 0.25 part of the indicated secondary stabilizer. There was blended into this master batch on a Brabender 0.25 parts of the indicated ultraviolet light absorber. If two ultraviolet light absorbers were used, there was employed 0.125 parts of each absorber. The Brabender was heated to 360°F and the sample blended for five minutes following initial fluxing. The sample was then removed and sheeted off on a hot two roll mill. 10–12 mil films were then compression molded to give samples for the Weatherometer tests.

The Weatherometer tests were carried out at a temperature of 140°–150°F, using a carbon arc, emission at approximately 2478A as the light source, weathering was 4 hours "sunlight" alternating with one hour rain, humidity 30–35% during light hours, 100% during combined light/rain hours.

The controls were Profax 6501 without additives.
The results are set forth in the following table.

Table 1

| Sample | Additives (in addition to calcium stearate) | Hours Stable |
|---|---|---|
| 1 | None | 148 |
| 2 | Cyasorb 531 | 510 |
| 3 | Tinuvin 328 | 138 |
| 4 | Irganox 1076 + trinonyl phenyl phosphite (TNPP) | 148 |
| 5 | Irganox 1076 + TNPP + Cyasorb 531 | 354 |
| 6 | Irganox 1076 + trilauryl trithiophosphite (TLTP) | 370 |
| 7 | Irganox 1076 + TLTP + Cyasorb 531 | 750 |
| 8 | Irganox 1076 + Weston 440 | 310 |
| 9 | Irganox 1076 + Weston 440 + Cyasorb 531 | 380 |
| 10 | Irganox 1076 + Weston 440 + Cyasorb 531 + Cyasorb 1084 | 438 |
| 11 | Cyasorb 531 + Cyasorb 1084 | 460 |
| 12 | Irganox 1076 + Weston 243-B + Cyasorb 531 | 790 |
| 13 | Irganox 1076 + phenyl didecyl phosphite + Cyasorb 531 | 320 |
| 14 | Irganox 1076 + octyl diphenyl phosphite + Cyasorb 531 | 320 |
| 15 | Irganox 1076 + WX618 + Cyasorb 531 | 780 |
| 16 | Irganox 1076 + Weston 9-3 P | 420 |
| 17 | Irganox 1076 + Weston 9-3 P + Cyasorb 531 | 1310 |
| 18 | Irganox 1076 + Weston 9-3 P + Cyasorb 531 + Cyasorb 1084 | (still on test) |
| 19 | Irganox 1076 + Weston 9-3 P +Cyasorb 531 + Ferro AM 101 | (still on test) |
| 20 | Irganox 1076 + Weston 9-4 P | 426 |
| 21 | Irganox 1076 + Weston 9-4 P + Cyasorb 531 | 1250 |
| 22 | Irganox 1076 + Weston 9-5 P | 400 |
| 23 | Irganox 1076 + Weston 9-5 P + Cyasorb 531 | 1250 |
| 24 | Irganox 1076 + Weston 9-6 P | 286 |
| 25 | Irganox 1076 + Weston 9-6 P + Cyasorb 531 | 1220 |
| 26 | Irganox 1076 + Weston 9-7 P | 400 |
| 27 | Irganox 1076 + Weston 9-7 P + Cyasorb 531 | 800 |
| 28 | Irganox 1076 + Weston 9-8 P | 265 |
| 29 | Irganox 1076 + Weston 9-8 P + Cyasorb 531 | 730 |

In the table, Weston 9-3 P is tetrakis (mercaptolauryl) 1,6-dimercaptohexylene diphosphite; Weston 9-4 P is pentakis (mercaptolauryl) bis (1,6-hexylenedimercapto) triphosphite, Weston 9-5 P is tetrakis (mercaptolauryl) 2,9-dimercapto-p-menthylenediphosphite, Weston 9-6 P is diphenyl di(mercaptolauryl) 1,2-dimercaptoethylene diphosphite, Weston 9-7 P is bis(-mercaptolauryl) 1,6-dimercaptohexylene bis(benzene phosphonite) and Weston 9-8 P is diphenoxy 1,6-dimercaptohexylene bis(benzene phosphonite).

EXAMPLE 2

Outdoor weathering tests were also carried out on polypropylene Profax 6501 samples in Miami, Fla. The formulations were the same as in example 1, except twice as much ultraviolet light absorber was employed, i.e. a total of 0.50 parts per 100 parts of polypropylene. The results at the end of 3 months are set forth in Table 2. The numerical ratings indicate the amount of change, 9 being slight, 6 definite and 4 medium.

Table 2

| Sample | Additives (in addition to calcium stearate) | Condition (color change) |
|---|---|---|
| 1 | Control | (shattered after 1 month) |
| 2 | Irganox 1076 + Weston 9-3 P | (decomposed 3rd month) |
| 3 | Irganox 1076 + Weston 9-6 P | (decomposed 3rd month) |
| 4 | Irganox 1076 + TNPP + Cyasorb 531 | (decomposed 3rd month) |
| 5 | Irganox 1076 + Weston 9-4 P | 9 (graying) |
| 6 | Irganox 1076 + Weston 9-3 P | 6 (graying) |
| 7 | Irganox 1076 + Weston 9-6 P | 6 (graying) |
| 8 | Irganox 1076 + Weston 9-5 P + Cyasorb 531 | 9 (graying) |
| 9 | Irganox 1076 + Weston 9-6 P + Cyasorb 531 | 9 (graying) |
| 10 | Cyasorb 531 | 4 (fading) |
| 11 | Irganox 1076 + Weston 9-3 P + Cyasorb 531 | 9 (graying) |
| 12 | Irganox 1076 + Weston 9-4 P + Cyasorb 531 | 9 (graying) |
| 13 | Irganox 1076 + Weston 9-3 P + Cyasorb 1084 | 6 (yellowing) |
| 14 | Irganox 1076 + Weston 9-3 P + Cyasorb 531 + Cyasorb 1084 | 9 (yellowing) |
| 15 | Weston 9-3P + Cyasorb 531 + Ferro AM101 | 9 (yellowing) |
| 16 | Irganox 1076 + Weston 9-3 P + Tinuvin 328 + Cyasorb 1084 | 9 (yellowing) |

Other typical stabilizer formulations are given in the following examples.

EXAMPLE 3

| | | |
|---|---|---|
| Polypropylene | 100 | parts |
| Weston 9-3 P | 0.2 | part |
| Cyasorb 531 | 0.2 | part |
| Irganox 1076 | 0.1 | part |

EXAMPLE 4

| | | |
|---|---|---|
| Polypropylene | 100 | parts |
| Weston 9-4 P | 0.2 | part |
| Tinuvin 327 | 0.25 | part |
| Catalin 14 | 0.15 | part |
| Cyasorb 531 | 0.25 | part |

EXAMPLE 5

| | | |
|---|---|---|
| Polyvinyl chloride | 100 | parts |
| Calcium stearate | 1 | part |
| Weston 9-5 P | 0.5 | part |
| Cyasorb 531 | 0.5 | part |

EXAMPLE 6

| | | |
|---|---|---|
| Polyvinyl chloride | 100 | parts |
| Barium-cadmium laurate | 1 | part |
| Dioctyl phthalate | 60 | parts |
| Weston 9-3 P | 0.5 | part |

In any of examples 1–6, the polypropylene or polyvinyl chloride can be replaced by one of the other polymers set forth supra, e.g. cellulose acetate, Dacron, natural rubber, SBR rubber, EPDM rubber, butadieneacrylonitrile rubber, ABS terpolymer, polystyrene, polyethylene terephthalate, styrene modified ethylene glycol maleate-phthalate polymer, etc.

In the examples the following commercially available products have been used:

Irganox 1010—Tetrakis [Methylene 3-(3, 5 Di-Tert-Butyl-4' hydroxyphenyl) Propionate] Methane; Ethyl 330—2, 4, 6 Tri(4 Hydroxy -3, 5 Di-Tert-Butyl Benzyl) Mesitylene; LTDP—Dilauryl thiodipropionate; STDP—Distearyl thiodipropionate; Antioxidant 425—2- 2'- Methylene - bis -(4-ethyl-6-t-butyl phenol); Good-rite 3114-1, 3, 5 Tris 3, 5 ditertiary butyl 4 hydroxy hydro cinnamoyl hexahydro symmetrical triazine.

EXAMPLE 7

| Polypropylene | 100 | parts |
|---|---|---|
| Ethyl 330 | 0.1 | part |
| Calcium Stearate | 0.1 | part |
| Cyasorb UV531 | 0.25 | parts |
| Weston 9-3 P | 0.25 | parts |

EXAMPLE 8

| Polypropylene | 100 | parts |
|---|---|---|
| Calcium Stearate | 0.1 | part |
| Topanol Ca | 0.1 | part |
| Weston 9-3 P | 0.25 | parts |
| Cyasorb UV531 | 0.25 | parts |

EXAMPLE 9

| Polypropylene | 100 | parts |
|---|---|---|
| Calcium Stearate | 0.1 | part |
| Irganox 1010 | 0.1 | part |
| Cyasorb UV531 | 0.5 | parts |
| Weston 9-3 P | 0.5 | parts |

EXAMPLE 10

| Polypropylene | 100 | parts |
|---|---|---|
| Calcium Stearate | 0.1 | part |
| Irganox 1010 | 0.15 | parts |
| Cyasorb UV531 | 0.25 | parts |
| Cyasorb UV1084 | 0.25 | parts |
| Weston 9-3 P | 0.50 | parts |

EXAMPLE 11

| Polypropylene | 100 | parts |
|---|---|---|
| Irganox 1076 | 0.15 | parts |
| LTDP | 0.25 | parts |
| Weston 9-3 P | 0.25 | parts |
| Cyasorb UV531 | 0.50 | parts |
| Calcium Stearate | 0.1 | part |

EXAMPLE 12

| Polypropylene | 100 | parts |
|---|---|---|
| Antioxidant 425 | 0.2 | parts |
| Calcium Stearate | 0.1 | part |
| STDP | 0.2 | parts |
| Weston 9-3 P | 0.2 | parts |
| Cyasorb UV531 | 0.5 | parts |

EXAMPLE 13

| Polypropylene | 100 | parts |
|---|---|---|
| Good-rite 3114 | 0.2 | parts |

-continued

| Calcium Stearate | 0.1 | part |
|---|---|---|
| Cyasorb UV531 | 0.5 | parts |
| Weston 9-3 P | 0.5 | parts |

What is claimed is:

1. Organic material normally susceptible to deterioration due to the effects of ultraviolet light containing a stabilizingly effective quantity of an admixture of (1) an ultraviolet light stabilizer selected from the group consisting of a benzotriazole and either nickel bis (octylphenyl) sulfide or 2,2'-thiobis-(4-t-octylphenolate) n-butylamine nickel, (2) a thiophosphite of the group consisting of

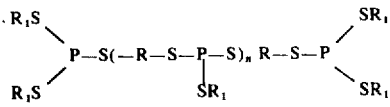

where $n$ is zero or an integer, R is divalent alkylene of at least 2 carbon atoms, cycloalkylene, arylene, alkyleneoxyalkylene having 2 to 8 carbon atoms in each alkylene group, alkylenethioalkylene having 2 to 8 carbon atoms in each alkylene group, alkylene (polyoxyalkylene) having 2 to 3 carbon atoms in each alkylene group and 2 to 3 oxygen atoms, $R_1$ is alkyl, haloalkyl, aryl, haloaryl, alkenyl, aralkyl, haloalkenyl or cycloalkyl, said thiophosphite being present in an amount sufficient to enhance the stabilizing effect of said ultraviolet light stabilizer, (3) a metal salt stabilizer selected from the group consisting of barium, strontium, calcium, cadmium, zinc, lead, tin, magnesium, cobalt, nickel, titanium and aluminum salts of an acid selected from the group consisting of phenols, fatty acids having 6 to 18 carbon atoms, ricinoleic acid, naphthenic acid, epoxy fatty acids and aromatic carboxylic acids and (4) a phenolic antioxidant.

2. Polypropylene normally susceptible to deterioration due to the effects of ultraviolet light containing a stabilizingly effective quantity of an admixture of (1) an ultraviolet light stabilizer which is a hydroxy benzophenone, (2) a thiophosphite of the group consisting of

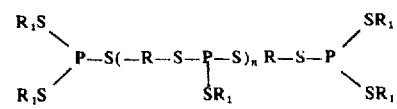

where $n$ is zero or an integer, R is divalent alkylene of at least 2 carbon atoms, cycloalkylene, arylene, alkyleneoxyalkylene having 2 to 8 carbon atoms in each alkylene group, alkylenethioalkylene having 2 to 8 carbon atoms in each alkylene group, alkylene (polyoxyalkylene) having 2 to 3 carbon atoms in each alkylene group and 2 to 3 oxygen atoms, $R_1$ is alkyl, haloalkyl, aryl, haloaryl, alkenyl, aralkyl, haloalkenyl or cycloalkyl, said thiophosphite being present in an amount sufficient to enhance the stabilizing effect of said ultraviolet light stabilizer, (3) a metal salt stabilizer selected from the group consisting of barium, strontium, calcium, and magnesium salts of a saturated fatty acid having 6 to 18 carbon atoms and (4) octadecyl-3-(3,5-di-tert. butyl-4-hydroxyphenyl) propionate acid.

* * * * *